United States Patent [19]

DenHerder

[11] 4,146,250
[45] Mar. 27, 1979

[54] STABILIZER UNIT FOR A PARKED VEHICLE

[76] Inventor: Gerald DenHerder, 7708 Pacific Hwy. E., Tacoma, Wash. 98424

[21] Appl. No.: 739,822

[22] Filed: Nov. 8, 1976

[51] Int. Cl.$^2$ .............................................. B60S 9/06
[52] U.S. Cl. .................................... 280/765; 212/145; 248/252; 254/86 R
[58] Field of Search ................ 280/764, 765; 212/145; 248/354 S, 252; 254/86 R, 86 H; 182/17

[56] References Cited

U.S. PATENT DOCUMENTS

| | | |
|---|---|---|
| 2,863,670 | 12/1958 | Larson .................................. 280/764 |
| 3,022,043 | 2/1962 | Weiss .............................. 248/354 S X |
| 3,354,038 | 10/1967 | Taylor .............................. 280/764 X |
| 3,489,428 | 1/1970 | Hunter et al. ......................... 280/765 |

Primary Examiner—Robert B. Reeves
Assistant Examiner—Michael J. Forman
Attorney, Agent, or Firm—Thomas W. Secrest

[57] ABSTRACT

A stabilizer unit for attachment to a parked vehicle comprises a base including a movable end and a fixed portion. Rollers are movably connected to said base and to a stabilizer leg. Translation of the rollers coarsely changes the elevation of the stabilizer leg. Rotation of a screw moves the movable end of the base and provides fine adjustment in elevation of the stabilizer leg.

12 Claims, 9 Drawing Figures

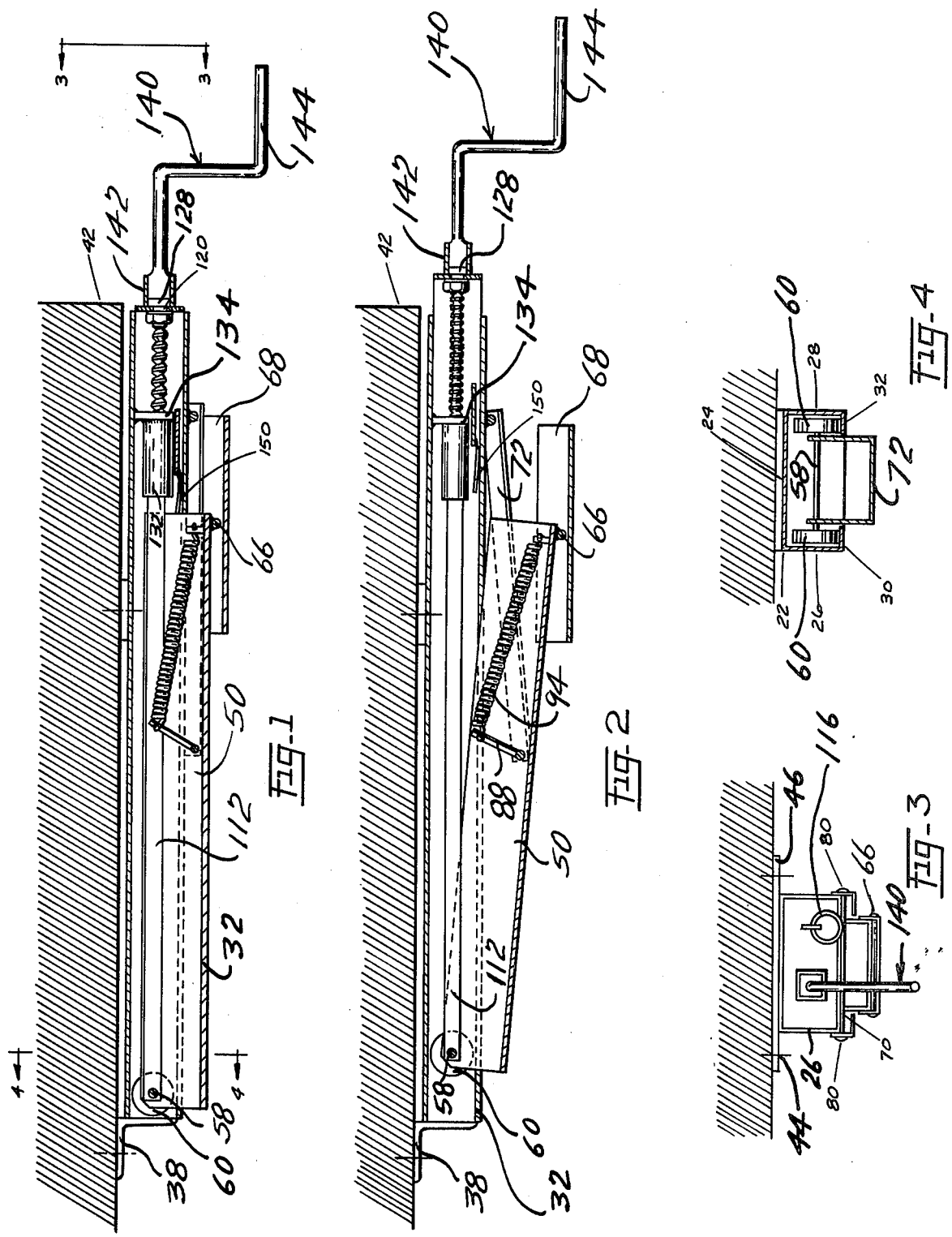

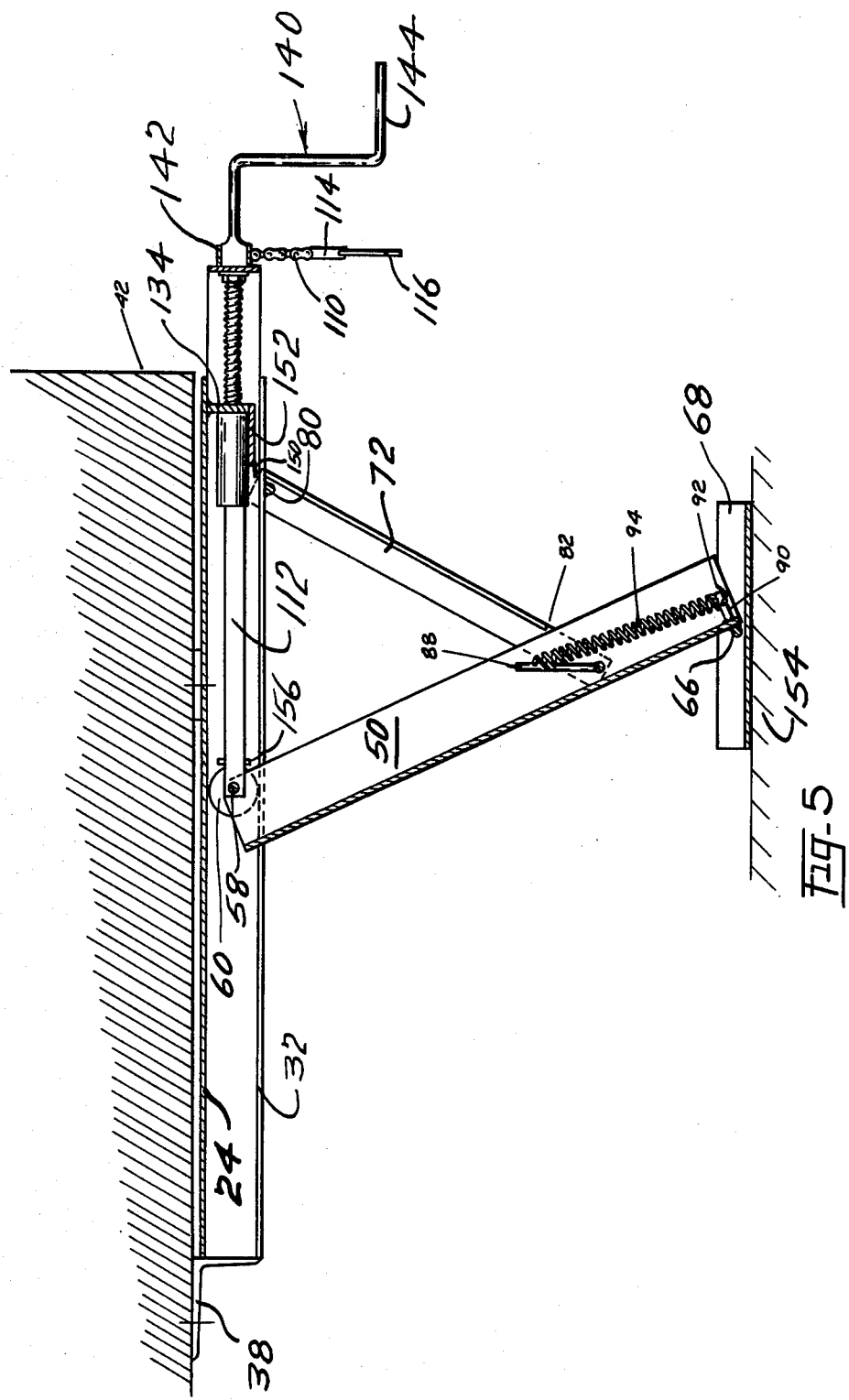

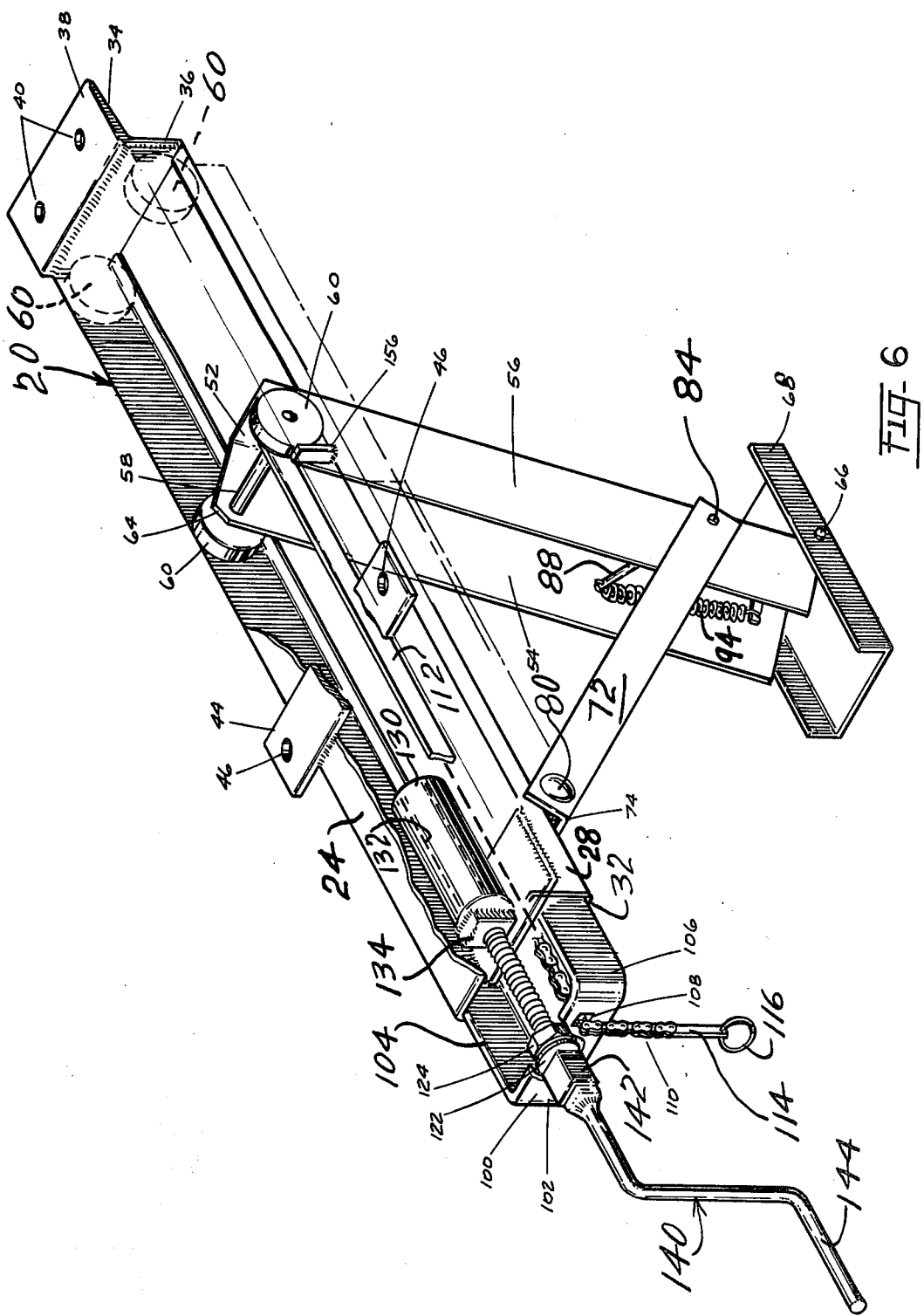

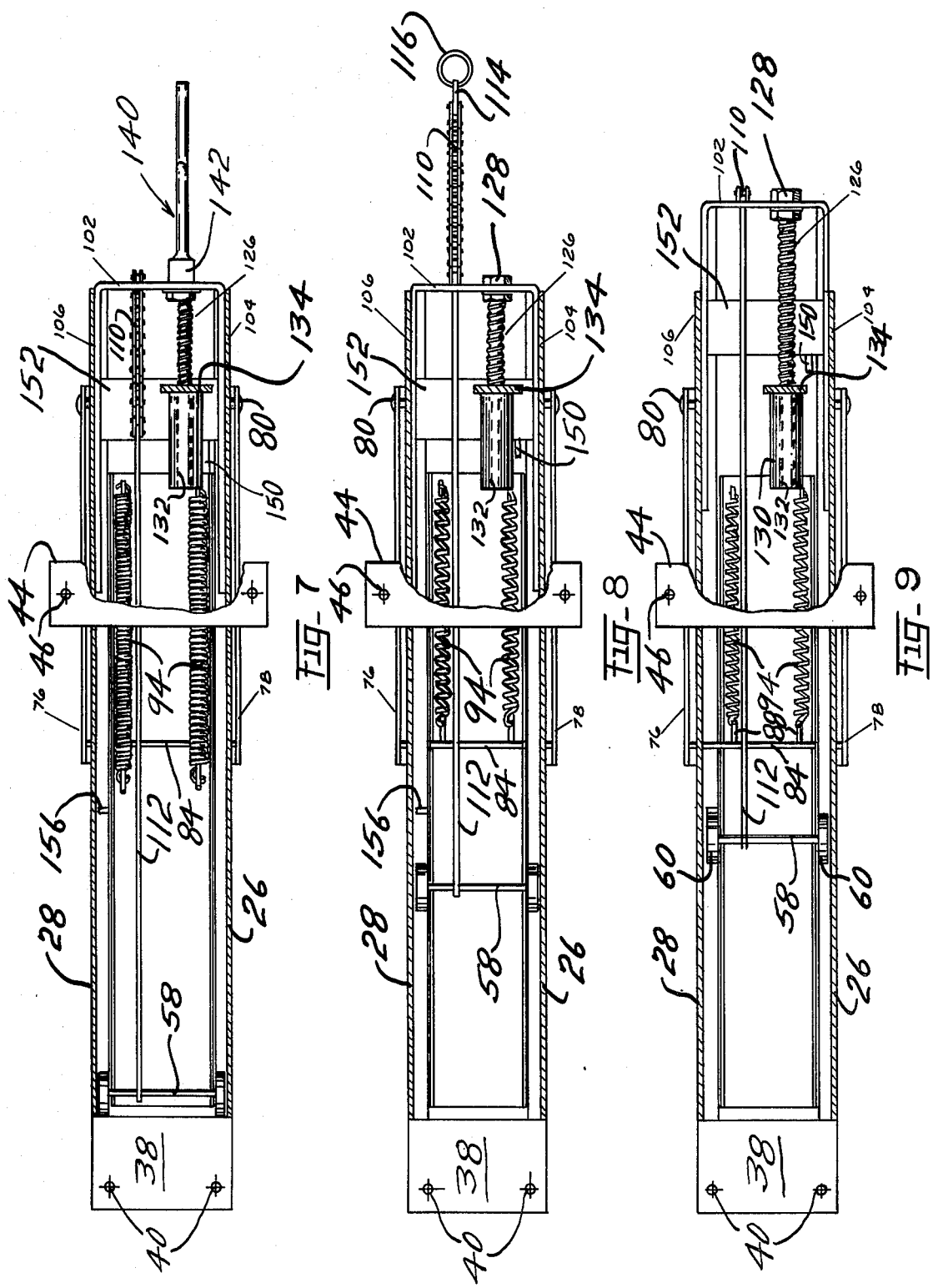

STABILIZER UNIT FOR A PARKED VEHICLE

THE BACKGROUND OF THE INVENTION

Many vehicles, such as recreational vehicles, trailer campers, can, beneficially, use stabilizing units. When the vehicle is parked and a person is walking around in the vehicle and if there be no stabilizer unit, then the vehicle rocks and moves and it is difficult to walk in the vehicle. With the placing of stabilizer units at the corners or sides of the parked vehicle, the vehicle is more steady and it is easier to walk in the trailer or vehicle. Normally, four stabilizer units will support the vehicle so that it is more steady and make for easier walking in the vehicle. There are commercially available stabilizer units. I am acquainted with some of these stabilizer units and have found that it is time consuming and, also, frustrating to lower the support leg from an elevated or stored position so that the support leg engages the ground for supporting the trailer. Generally, a considerable amount of time is employed in moving the support leg from the elevated position to the ground-engaging position. After the support leg has assumed the ground-engaging position, then it is necessary to further move the support leg so as to firmly position the vehicle or trailer. From experience, I have found that more time is consumed in lowering the support leg from the stored or transport position to the ground engaging position than is consumed in bracing and propping the vehicle with the support leg once in the ground-engaging position. Conversely, very little time is consumed in moving the support leg from the propping and supporting position to a nonpropping or nonsupporting position with the support leg in touch with the ground as compared with the step of raising the support leg from the ground-engaging position to the travel or stored position. In essence, the amount of time used for moving the support leg from stored position to ground-engaging position or from ground-engaging position to stored position is greater than the time consumed in adjusting the support leg from the ground-engaging position to a supporting position or from a supporting position to a ground-engaging position. This time-consuming factor is annoying and frustrating to a person trying to set up his parked vehicle for use or is frustrating for the person trying to remove his vehicle from use and for putting in a position to travel.

THE GENERAL DESCRIPTION OF THE INVENTION

The support unit of this invention is attached to the underneath side of the vehicle. There is a rotatable support or stabilizer leg which can rotate so as to be next to the vehicle and out of position so that the vehicle can travel without the support leg causing an obstruction to traveling. Then, when it is desired to have the support leg in operative position for supporting the vehicle, the support leg can be rotated so as to engage the ground. Then, the support leg can be further rotated so as to provide a prop or support for the vehicle. With this stabilizer unit, it is possible to quickly lower the support leg from a stored position to a ground-engaging position. In fact, with this unit, the support leg will fall from the support position to the ground-engaging position by pulling a lever. As a result, it is not necessary to go through the time-consuming procedure of lowering the support leg from the stored or transport position to the ground-engaging position. Conversely, when it is desired to raise the support leg from the ground-engaging position to the transport or stored position, the lever can be moved and the support leg will, quickly, elevate to the transport or stored position. With this invention, the time is used for adjusting the support characteristics of the support leg so that the support leg is maneuvered to support the vehicle. The time is not used in lowering the support leg from a stored or transport position to a ground-engaging position or in elevating the support leg from a ground-engaging position to a stored or transport position. As a result, the person with the vehicle can spend more of his time doing things he wants to do instead of having to lower a support leg or raise a support leg in a slow and awkward manner.

THE OBJECTS AND THE ADVANTAGES

An object of this invention is to provide a stabilizing unit having a quick-acting mechanism for lowering the stabilizer leg and foot from a stored or transport position to a position for contact with the ground; a further object is to provide a stabilizing unit having a quick-acting mechanism for raising the leg and foot from contact with the ground to a stored or transport position; another important object is to provide such a stabilizer unit of straightforward construction with few moving parts; an additional object is to provide a stabilizer unit which can be positioned on a vehicle so as to be, substantially, out of sight when not in use and when being transported; another important object is to provide such a stabilizer unit which can be manufactured from, readily, commercially, available parts and material; and, a further object is to provide such a stabilizer unit which is inexpensive to manufacture and is, relatively, free from maintenance.

These and other important objects and advantages of the invention will be more particularly brought forth upon reference to the detailed description of the invention, the appended claims, and the accompanying drawings.

THE DRAWINGS

FIG. 1 is a longitudinal, vertical, cross-sectional view illustrating the invention with the support leg and foot raised to be in a stored or transport position and with the locking mechanism contacting the stabilizer leg so as to prevent rotation, downwardly, of the stabilizer leg;

FIG. 2 is a longitudinal, vertical, cross-sectional view of the stabilizer unit and illustrates the locking mechanism moved away from the stabilizer leg so as to allow the stabilizer leg to rotate downwardly;

FIG. 3, taken on line 3—3 of FIG. 1, is an end elevational view looking into the stabilizer unit with the crank in position;

FIG. 4, taken on line 4—4 of FIG. 1, is a lateral, vertical, cross-sectional view showing the components of construction of the stabilizer unit and illustrating the base, the rotatable support leg, and the rollers for moving in the base;

FIG. 5 is a longitudinal, vertical, cross-sectional view of the stabilizer unit mounted on the underneath side of the vehicle and illustrates a rotatable stabilizer leg and foot in contact with the ground in a supporting position for the vehicle;

FIG. 6 is an isometric view looking down on the stabilizer unit and illustrates the arrangement of the components and illustrates the rotatable stabilizer leg and foot in a lowered position and with the crosshead screwed out of the base so as to move the upper end of the stabilizer leg toward the outside of the base;

FIG. 7 is a plan view looking down on the inner part of the stabilizer unit and illustrates the unit in a transport or stored position;

FIG. 8 is a plan view looking down on the inner part of the stabilizer unit and illustrates the crosshead as moved part away out of the base and with the rotatable stabilizer leg in lowered position in contact with the ground but not in a supporting position between the ground and the vehicle; and, FIG. 9 is a plan view looking down on the inner part of the stabilizer unit and illustrates the crosshead as being screwed out of the base and with the stabilizer leg in a supporting position between the ground and the vehicle.

THE SPECIFIC DESCRIPTION OF THE INVENTION

In the drawings, there is illustrated a stabilizer unit 20.

This unit comprises an elongated base 22 having a cover member 24 and which cover member on its opposite side depends downwardly into legs 26 and 28. The leg 26 bends inwardly into a foot or flange 30 and the leg 28 bends inwardly into a foot or flange 32.

At the rear of the base 22, there is an angle bracket 34 having a first leg 36 and a second leg 38. The first leg 36 is welded to the end of the base. In the second leg 38, there are two passageways 40 for receiving screws or bolts for attaching the stabilizer unit to the underside of a vehicle 42.

Toward the front end of the stabilizer unit 20, there is a bracket 44 having two spaced apart passageways 46 for receiving screws and bolts to assist in attaching the stabilizer unit to the underside of the vehicle 42.

There is a rotatable stabilizer leg 50 in the general configuration of a U-channel having a base 52 and two spaced-apart legs 54 and 56. A shaft 58 projects through passageways in the upper ends of the legs 54 and 56. On the outer end of the shaft 58 are rollers or wheels 60 which serve as guide means for the stabilizer leg 50 as explained hereinafter. In FIGS. 4, 7, 8, and 9, it is seen that the wheels or rollers 60 are on the outside of the legs 54 and 56 of the U-channel. The rollers 60 ride on the inner surface of the feet or flange 30 and 32 and are guided by the legs 26 and 28 and, also by the feet 30 and 32. It is seen that the upper and outer parts of the legs 54 and 56 are cut back at 64 so as to allow the legs to rotate in the base 22 and not contact the inner surface of the cover of member 24. Further, the stabilizer leg 50 is free to rotate around the shaft 58.

There is a shaft 66 which projects through the lower and outer end of the legs 54 and 56. There is mounted on this shaft 66 a foot 68. The foot 68 is free to rotate around the shaft 66. In this manner there is provided a foot 68 which has a large bearing surface. With the movement of the rotatable stabilizer leg 50, the foot 68 can also move and rotate.

There is attached to the underneath side of the two feet 30 and 32, a shaft 70. The shaft 70 may be welded to the base 22. There is rotatably mounted on the shaft 70, a rotatable support 72 in the general configuration of a U-channel having a base 74 and two spaced-apart legs 76 and 78. The shaft 70 passes through passageways in the upper parts of the legs 76 and 78. The ends of the shaft 70 may be swaged at 80 so as to position the rotatable support 72 onto the shaft 70. The outer end of the base 74 is cut back or removed at 82. This allows the legs 76 and 78 to be on the outside of the legs 54 and 56 of the rotatable stabilizer leg 50. Further, there is a shaft 84 which projects through the legs 76 and 78 of the rotatable support 72 and also projects through the legs 54 and 56 of the rotatable stabilizer leg 50. The shaft 84 is definitely positioned in the legs 76 and 78 and does not rotate with respect to the legs 76 and 78. However, the legs 54 and 56 of the rotatable stabilizer leg 50 can rotate around the shaft 84. The upper area end of the rotatable support 72 is fixed with respect to the base 22.

As, previously, stated, the shaft 84 is fixed with respect to the rotatable support 72 and the rotatable stabilizer leg 50 rotates around the shaft 84. There is attached to the shaft 84, two spaced-apart arms 88. These arms 88 are welded to the shaft 84 between the legs 54 and 56. In FIG. 5, it is seen that near the lower end of the rotatable stabilzer leg 50, there is attached two lugs 90. Each of the lugs 90 has a catch 92. A spring 94 connects each lug 90, at the catch 92, with a respective arm 88.

The purpose of the lugs 90, the arms 88 and the springs 94 is to assist in elevating the rotatable stabilizer leg 50 upwardly toward the base 22. In FIG. 5, it is seen that the arms 88 are pointed, substantially, vertically and that the spring 94 is extended and under tension. In this position, there is a tendency for the spring 94 to rotate the rotatable stabilizer leg 50 upwardly. If the rotatable stabilizer leg 50 could rotate upwardly, the springs 94 would bring it upwardly so as to have the leg 50 in the position illustrated in FIG. 1. In FIG. 1, it is seen that the arms 88 are rotated so as to be closer to the lugs 90 and thereby to relieve the tension on the springs 94. Then, the stabilizer unit can be placed in storage or transport position.

With reference to FIG. 6, it is seen that there is provided a movable end on the base 22, namely a crosshead 100 having a base 102 and legs 104 and 106. It is seen that the crosshead 100 is substantially a U-member comprising the base and the legs. The U-member 100 cofits with the base 22 so that the legs 104 and 106 slide in the base 22. In the base, the cover member 24, the leg 26 and the foot 30 guide the leg 104 of the U-member 100 and the cover member 24 and the leg 26 and the foot 32 guide the leg 106 of the U-member 100. In the drawings, it is seen that crosshead 100 moves, rectilinearly with respect to the base 22.

The base 102 has a passageway 108. A chain 110 passes through this passageway and connects with a connecting link 112. The connecting link 112 connects with the shaft 58. On the free end of the chain 110, there is a link 114 and a ring 116. With the stabilizer unit in a transport or storage position as illustrated in FIG. 8, it is possible to rapidly lower the rotatable stabilizer leg 50 by pulling on the ring 116 so as to pull forwardly the roller chain 110 and the connecting link 112 and thereby pull forwardly the shaft 58. This action rotates downwardly the rotatable stabilizer leg 50 so that the foot 68 can be in contact with the ground. The roller chain 110 can be definitely positioned with respect to the crosshead 100 so that the roller chain 110 wil not move with respect to the crosshead 100.

Further, in the crosshead 100, there is a passageway 120. On the inside of the base 102, there is aligned with the passageway 120, a washer 122, and the washer 122 is welded to the base 102. Also, on the inside of the washer 122 and aligned with the passageway 120 and the passageway in the washer, there is welded a nut 124.

There is threaded into the nut 124 a screw 126. On the outer end of the screw 126, there is welded a stud 128.

The inner end of the screw 126 moves in a guide 130 having a longitudinal passageway 132. On that end of the guide facing the nut 124, there is welded a nut 134. The screw 126 can move in the nut 134 and also in the passageway 132. The guide 130 is welded or attached to the cover member 24 so that the guide is stationary.

There is a crank 140 having a socket 142 for mating with the stud 128. The crank 140 has a handle 144 for rotating the socket 142.

The operation of the stabilizer unit 20 will be described. In FIG. 7, the stabilizer unit 20 is attached to the underneath side of the vehicle 42. In conjunction with FIG. 7, the reader is advised to look at FIG. 1 where there is illustrated the longitudinal, vertical, cross-sectional view of the stabilizer unit 20. In FIGS. 1 and 7, it is seen that the stabilizer unit is in a transport or storage position with the rotatable stabilizer leg 50 elevated so as to be adjacent or juxtapositioned to the base 22. A leaf lock 150 is welded to the underneath side of a crossbrace 152. The crossbrace 152 is welded to the inside of the legs 104 and 106 of the U-member 100. The free end of the leaf lock 150 bears against the end of the rotatable stabilizer leg 50 so as to lock this leg in an upward position or a transport or storage position. In order to lower the leg 50, it is necessary to rotate the stud 128 so as to rotate the screw 126 and to move the U-member 100 away from the end of the leg 50 and also to remove the leaf lock or spring 150 out of contact with the leg 50. Then, an operator can pull on the ring 116 so as to pull forwardly the shaft 58 toward the U-member 100. The forward movement of the shaft 58 allows the rotatable stabilizer leg 50 to rotate downwardly and also allows the rotatable support 72 to rotate downwardly. With the rotation of the leg 50 downwardly, the foot 68 contacts the ground. It is to be realized that in this operation of pulling the roller chain 110 forwardly and also pulling the shaft 58 forwardly, the crosshead 100 does not move. The roller chain 110 can be positioned in the passageway 108 in the base 102 so as to definitely position the shaft 58 with respect to the crosshead 100. Then, in order to have the rotatable stabilizer leg 50 in a stabilizing or supporting position, it is necessary to bring the shaft 58 forwardly. This is accomplished by rotating the stud 128 with the crank 140 so as to move, outwardly, the crosshead out of the base 22. With the movement of the crosshead 100 out of the base 22, the shaft 58 is moved forwardly and the stabilizer leg 50 is moved so as to be in a more vertical position and a more stabilizing position for the stabilizer 20 and the vehicle 42. In moving the stabilizer leg 50 so as to be in stabilizing or supporting position for the vehicle 42, the shaft 58 and the crosshead 100 are moved, simultaneously, and in unison so that the leg assumes a more stabilizing position.

In order to add firmness to the vehicle 42, there are a plurality of stabilizing units 20. For example, there may be four of these stabilizing units, viz., one at each corner of the vehicle 42. The stabilizing units 20 are to add firmness or support to the vehicle 42 and are not, necessarily, jacks for jacking upwardly the vehicle 42. The stabilizing units 20 are designed for stabilizing the vehicle 42 and making it possible for a person in the vehicle 42 to walk without the vehicle 42 moving and rolling and rocking. The result is that there is a more firm and even footing for a person walking in the vehicle 42.

From the foregoing, it is seen that it is possible to quickly lower the stabilizer leg 50 from a rest or storage or transport position to a ground-engaging position. This is done by pulling forwardly on the roller chain 110 so as to rotate the stabilizer leg 50 downwardly so that the foot 68 can engage the ground. Then, the screw 126 can be rotated so as to move the crosshead, the shaft 58, and also to rotate the stabilizer leg 50 to be in a stabilizing position with respect to the ground 154.

To elevate the rotatable stabilizer leg 50 from a ground-engaging position as illustrated in FIGS. 5, 6, and 9, to a transport or storage position as illustrated in FIGS. 1 and 7, it is necessary to release the roller chain 110. In order to, rapidly, go from the stabilizing position as illustrated in FIGS. 5, 6, and 9, it is necessary, only, to release the roller chain 110 to allow the springs 94 to raise the rotatable stabilizer leg 50 in an upwardly direction. In this step, the shaft 58 moves away from the crosshead 100. It is to be remembered that the crosshead 100 is positioned, outwardly, from the base 22. Now, it is necessary to move the crosshead 100 into the base 22. This is accomplished by rotating the screw 126. When the crosshead 100 is in the base 22, the leaf lock 150 will contact the outer edge of the legs 104 and 106. In this manner, the leg 50, the rotatable support 72, and the foot 68 are elevated so as to be next to the base 22 and to be in transport or storage position.

In FIG. 6, it is seen that there is a box or wedge 156 welded to the inner part of the leg 28 or welded onto the foot 32 of the base 22 so as to restrict the forward movement of the rollers 60 and the shaft 58.

In FIG. 5, it is seen that the stabilizer unit 20 can fit underneath the vehicle 42. When in storage or transport position, the stabilizer unit 20 is, substantially, hidden from view and is not noticed except by the operator or the owner of the vehicle 42. Then, when in use, the handle can be placed on the socket so as to rotate the leg 50 in a stabilizing position.

In order for a patent to issue, the invention must be new, useful and unobvious.

35 USC 101 states:

"Whoever invents or discovers any new and useful process, machine, manufacture, or composition of matter, or any new and useful improvement thereof, may obtain a patent therefor, subject to the conditions and requirements of this title."

I consider this invention to be new as I have provided a stabilizer unit whereby the stabilizer leg be, rapidly, lowered from a transporter storage position to a stabilizing position. Further, the stabilizer leg can be, rapidly, raised from a stabilizing position to a transporter storage position. There is no need to spend considerable time in raising or lowering the stabilizer leg from the transporter storage position to stabilizing position. I know of no other stabilizer unit having this feature.

I consider the invention to be useful as the invention can be used in stabilizing a vehicle, such as a camper, recreational vehicle, trailer, and the like so that it is easier to walk in the vehicle when it is at rest or in a parked position. A person can walk in the vehicle without rocking the vehicle.

35 USC 103 states:

"A patent may not be obtained though the invention is not identically disclosed or described as set forth in section 102 of this title, if the differences between the subject matter sought to be patented and the prior art are such that the subject matter as a whole would have been obvious at the time the invention was made to a person having ordinary skill in the art to which said subject matter pertains. Patentability shall not be negatived by the manner in which the invention was made."

I consider the invention to be unobvious as it is the only stabilizer unit I know whereby there is a rapid lowering of the stabilizer leg from a transporter storage position to a stabilizing position or the rapid raising of the stabilizer leg from a stabilizing position to transporter storage position without having to move a screw mechanism. This rapid lowering and raising of the stabilizer leg eases frustration and also requires less time than with the stabilizer unit needing a screw mechanism for raising and lowering the stabilizer leg. Again, I know of no stabilizing unit having these characteristics.

In preparing this patent application, there was made a patent search. The references found in this patent search are as follows:

| Patent No. | Patentee |
|---|---|
| 1,727,430 | E. R. Gilkison |
| 3,096,065 | C. A. Horne |
| 3,345,038 | F. G. Taylor |
| 3,370,817 | B. R. Weber et al. |
| 3,454,251 | D. A. Dye |
| 3,489,428 | W. B. Hunter et al. |
| 3,537,724 | R. E. Matthews |
| 3,565,396 | R. S. Spear |
| 3,625,542 | R. D. Curtis |
| 3,669,409 | J. Eranosian |
| 3,692,329 | T. E. Conner |
| 3,854,750 | C. Voehringer, Jr. |
| 3,870,276 | D. P. Phillips |
| 3,879,055 | M. N. Sill et al. |
| 3,897,044 | E. Tallman |

From the foregoing and having presented my invention, what I claim is:

1. A stabilizer unit comprising:
   a. an elongated base including a movable end and a fixed portion;
   b. a stabilizer leg, one end of said stabilizer leg pivotably connected to a guide means;
   c. said guide means being movably connected to said base and constrained to translate lengthwise along said base;
   d. a support, said support pivotably connected at one end to said base and at the other end pivotably connected to said stabilizer leg;
   e. means for varying the length of said base by moving said movable end of said base relative to the fixed portion of said base;
   f. means for translating said guide means along the length of said base;
   g. means for releasably engaging said means for translating said guide means with said movable end of said base, whereby a selected distance between said guide means and said movable end of said base can be set and releasably maintained; whereby the other end of said stabilizer leg moves away from said base when said distance between said guide means and said movable end is reduced or the length of said base is varied to move said guide means toward said movable end of said base.

2. The stabilizer unit of claim 1 wherein said base has extended flanges along its longitudinal edges and said guide means includes rollers moving on said flanges, whereby said guide means are rapidly translated.

3. The stabilizer unit of claim 1 wherein said means for translating said guide means includes a link chain connected to said guide means, and wherein said means for releasably engaging said link chain is fixedly mounted to said movable end.

4. The stabilizer unit of claim 1 wherein said means for varying the length of said base include:
   a. said movable end;
   b. a threaded nut receiver fixedly attached to said fixed portion of said base;
   c. a threaded shaft rotatably mounted on said movable end and extending longitudinally toward said translatable guide means and engaging said threaded receiver;
   d. means to rotate said threaded shaft; whereby said movable end moves slowly and said base is extended when said threaded shaft is rotated in one direction, and said base is shortened when said threaded shaft is rotated in the other direction.

5. The stabilizer unit of claim 4 wherein said base is generally rectangular in cross-section and said movable end is a U-member slidable-longitudinally within said fixed portion of said base.

6. The stabilizer unit of claim 1 and further comprising means for locking the other end of said stabilizer leg against said base.

7. The stabilizer unit of claim 6 wherein said means for locking comprises a spring, said spring being mounted on said base and bearing against said stabilizer leg.

8. The stabilizer unit of claim 1 and further comprising a foot positioned on the other end of said stabilizer leg.

9. The stabilizer unit of claim 1 in combination with a vehicle wherein said stabilizer unit is operatively attached to said vehicle whereby said vehicle is stabilized.

10. The combination of claim 9 and further comprising more than one of said stabilizer units operatively attached to said vehicle.

11. The stabilizer unit of claim 1 and further comprising a tension spring connected between the outer end of said stabilizer leg and said support, whereby said stabilizer leg is biased toward said base.

12. The stabilizer unit of claim 11 wherein said spring connects to said support proximate said connection between said support and said stabilizer leg.

* * * * *